United States Patent
Ikeda

(10) Patent No.: US 8,290,494 B2
(45) Date of Patent: Oct. 16, 2012

(54) MOBILE COMMUNICATION SYSTEM, MOBILE STATION DEVICE, BASE STATION DEVICE, AND HANDOVER METHOD

(75) Inventor: Goro Ikeda, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 187 days.

(21) Appl. No.: 12/679,897

(22) PCT Filed: Sep. 10, 2008

(86) PCT No.: PCT/JP2008/066305
§ 371 (c)(1),
(2), (4) Date: Apr. 26, 2010

(87) PCT Pub. No.: WO2009/041258
PCT Pub. Date: Apr. 2, 2009

(65) Prior Publication Data
US 2010/0210270 A1    Aug. 19, 2010

(30) Foreign Application Priority Data
Sep. 26, 2007   (JP) ................................ 2007-249489

(51) Int. Cl.
*H04W 36/34* (2009.01)
(52) U.S. Cl. ........ 455/437; 455/436; 455/438; 455/439; 455/464; 455/442; 370/330; 370/331; 370/332; 370/329
(58) Field of Classification Search .......... 455/436–437, 455/439, 442, 418, 438, 464; 370/330, 331, 370/332, 329
See application file for complete search history.

(56) References Cited

U.S. PATENT DOCUMENTS

| 6,501,952 B1 * | 12/2002 | Foster et al. .................. 455/436 |
| 7,310,519 B2 * | 12/2007 | Okita et al. .................. 455/418 |
| 2005/0208944 A1 | 9/2005 | Okita et al. |
| 2008/0310611 A1 | 12/2008 | Moriwaki et al. |

FOREIGN PATENT DOCUMENTS

CN          1989746           6/2007
(Continued)

OTHER PUBLICATIONS

International Preliminary Report on Patentability for PCT/JP2008/066305, issued Apr. 7, 2010, 6 pages.

(Continued)

*Primary Examiner* — Kiet Doan
*Assistant Examiner* — Michael T Vu
(74) *Attorney, Agent, or Firm* — Duane Morris LLP; Richard C. Kim

(57) ABSTRACT

A communication path between base stations connected via a network is switched so that data received by a mobile station that is during handover is not interrupted. A mobile station (14-1) which has started a radio communication with a handover destination base station (12-2) switches a acquisition destination of data transmitted from a mobile station (14-2) with which the mobile station (14-1) communicates from a handover source base station (12-1) to the handover destination base station (12-2). After this, the mobile station (14-1) transmits a communication path switching request to a base station (12-3) which performs a radio communication with the mobile station (14-2). In response to the communication path switching request transmitted from the mobile station (14-1), the base station (12-3) releases an RTP session established with respect to the handover source base station (12-1).

8 Claims, 10 Drawing Sheets

FOREIGN PATENT DOCUMENTS

| | | |
|---|---|---|
| EP | 1 775 891 | 4/2007 |
| JP | 03-077442 | 4/1991 |
| JP | 04-371028 | 12/1992 |
| JP | 2007-174357 | 5/2007 |
| JP | 2007-142786 | 6/2007 |
| WO | WO-2006/011493 | 2/2006 |
| WO | WO-2006/130063 A1 | 12/2006 |

OTHER PUBLICATIONS

International Search report for PCT/JP2008/066305, mailed on Dec. 2, 2008, 2 pages.

Chinese First Office Action, Patent Application No. 200880109027.7 dated Jun. 28, 2012.

* cited by examiner

MOBILE COMMUNICATION SYSTEM, MOBILE STATION DEVICE, BASE STATION DEVICE, AND HANDOVER METHOD

CROSS-REFERENCE TO RELATED APPLICATIONS

This application is a U.S. national phase application of International Application No. PCT/JP2008/066305 filed 10 Sep. 2008, which claims benefit of Japanese Patent Application No. 2007-249489 filed 26 Sep. 2007. The contents of these applications are herein incorporated by reference in their entirety.

TECHNICAL FIELD

The present invention relates to a mobile communication system, a mobile station device, a base station device, and a handover method, and more particularly to a handover technology in a mobile communication system including a plurality of base station devices connected to each other via a network.

BACKGROUND OF ART

In recent years, in a mobile communication system such as a cellular phone or a personal handy-phone system (PHS), with an aim to improve a speech quality and reduce line costs, etc., a study has been made to switch a backbone between base stations from a line switching network to an IP network. In a mobile communication system in which the base stations are connected to each other by an IP network, communication paths between the base stations are switched with handover of a mobile station.

FIGS. 14 to 17 are diagrams for illustrating a procedure for a mobile station 74-1 that makes a call connection with a mobile station 74-2 to perform handover from a base station 72-1 to a base station 72-2 in a conventional mobile communication system 70 where a real-time transport protocol (RTP) being one of connectionless transport protocols is applied to a data communication between the base stations. As illustrated in FIGS. 14 to 17, an RTP session 1 (switching source session) is established between the handover source base station 72-1 and the base station 72-3 that makes a radio communication with the mobile station 74-2 before the mobile station 74-1 starts handover, and communication data is transmitted and received by the aid of the RTP session 1 (refer to FIG. 14).

In this example, when the mobile station 74-1 starts handover to the base station 72-2, a new RTP session 2 (switching destination session) is established between the handover destination base station 72-2 and the base station 72-3, and data is transmitted and received by both sessions of the RTP session 1 and the RTP session 2 (refer to FIG. 15). In this state, only data received by the RTP session 1 is used in the mobile stations 74-1 and 74-2. That is, the mobile station 74-1 uses only data received from the handover source base station 72-1, and discards data received from the handover destination base station 72-2. Further, the base station 72-3 transmits only data received by the RTP session 1 to the mobile station 74-2, and discards data received by the RTP session 2.

Upon establishment of the RTP session 2, the base station 72-3 releases the RTP session 1 being the switching source session (refer to FIG. 16). Thereafter, data transmitted or received by the RTP session 2 is used in the mobile stations 74-1 and 74-2 (refer to FIG. 17).

It should be noted that Patent document 1 discloses a technology by which two identical speech sessions are established among two terminals and a handover server located between those terminals at the same time, to thereby realize seamless handover processing. Patent document 1: JP 2007-142786 A

DISCLOSURE OF THE INVENTION

Problems to be Solved by the Invention

However, in the above-mentioned conventional mobile communication system, there is a case in which data received by the mobile station that is during handover is interrupted because a timing at which the mobile station that performs handover switches a data acquisition destination is asynchronous with a timing at which a communication path between the base stations is switched.

For example, in the mobile communication system 70 illustrated in FIGS. 14 to 17, the mobile station 74-1 acquires empty data having no information (soundless data in the voice communication) as receive data during a period of time from the release of the RTP session 1 by the base station 72-3 until the start of use of data received by the RTP session 2 by the mobile station 74-1 (stage between FIGS. 16 and 17).

The present invention has been made in view of the above-mentioned problem with the conventional art, and aims at providing a mobile communication system, a mobile station device, a base station device, and a handover method, which switch a communication path between the base stations which are connected to each other via a network so as not to interrupt data received by the mobile station device undergoing handover.

Means for Solving the Problems

In order to solve the above-mentioned problem, the present invention provides a mobile communication system including: a first mobile station device that performs handover from a first base station device to a second base station device; and another base station device that communicates with each of the first and second base station devices via a network, and performs a radio communication with a second mobile station device that makes a call connection with the first mobile station device, in which the first mobile station device includes: first data acquisition destination switching means for switching an acquisition destination of data transmitted from the second mobile station device from the first base station device to the second base station device after a radio communication with the second base station device starts; and means for transmitting a switching request for a communication path to the another base station device after the first data acquisition destination switching means switches the acquisition destination of data, and in which the another base station device includes communication path control means for completing a communication with the first base station device in response to the switching request for the communication path which is transmitted from the first mobile station device.

In the present invention, after the mobile station device that performs handover has switched the acquisition destination of the receive data from the handover source base station device to the handover destination base station device, the another base station device completes a communication with the handover source base station device. According to the present invention, data received by the mobile station device undergoing handover can be prevented from being interrupted.

In an aspect of the present invention, the first mobile station device further includes first receive timing difference measurement means for measuring a difference between a timing at which the first mobile station device receives data transmitted from the another base station device through the first base station device, and a timing at which the first mobile station device receives data identical with the data transmitted from the another base station device through the second base station device, and the first data acquisition destination switching means switches the data acquisition destination on the basis of the timing difference measured by the first receive timing difference measurement means. According to this aspect, data received by the mobile station device undergoing handover can be prevented from being interrupted, and the continuity of the data can be ensured.

Further, in an aspect of the present invention, the another base station device further includes first determination information adding means for adding first determination information for determining identity to each of data transmitted to the first mobile station device through the first base station device, and data identical with the data and transmitted to the first mobile station device through the second base station device, and the first receive timing difference measurement means measures a difference between a timing at which the first mobile station device receives the data to which the first determination information is added through the first base station device, and a timing at which the first mobile station device receives the data to which the first determination information is added through the second base station device. According to this aspect, continuity of data received by the mobile station device undergoing handover can be ensured more easily.

Further, in an aspect of the present invention, the another base station device further includes: second receive timing difference measurement means for measuring a difference between a timing at which the another base station device receives the data transmitted from the first mobile station device through the first base station device, and a timing at which the another base station device receives the data identical with the data transmitted from the first mobile station device through the second base station device; and second data acquisition destination switching means for switching the acquisition destination of data transmitted to the second mobile station device from the first base station device to the second base station device on the basis of the timing difference measured by the second receive timing difference measurement means, and the communication path control means completes the communication with the first base station device after the data acquisition destination is switched by the second receive timing difference measurement means. According to this aspect, data received by the mobile station device undergoing handover can be prevented from being interrupted, and the continuity of the data transmitted from the mobile station device can be ensured.

Further, in an aspect of the present invention, the first mobile station device further includes second determination information adding means for adding second determination information for determining identity to each of data transmitted to the second mobile station device through the first base station device, and data identical with the data and transmitted to the second mobile station device through the second base station device, and the second receive timing difference measurement means measures a difference between a timing at which the another base station device receives the data to which the second determination information is added through the first base station device, and a timing at which the another base station device receives the data to which the second determination information is added from the second base station device. According to this aspect, continuity of data transmitted from the mobile station device undergoing handover can be ensured more easily.

Further, the present invention provides a mobile station device that performs handover from a first base station device to a second base station device while maintaining a call connection with another mobile station device, the first base station device and the second base station device each communicating with another base station device that performs a radio communication with the another mobile station device via a network, the mobile station device including: data acquisition destination switching means for switching an acquisition destination of data transmitted from the another mobile station device from the first base station device to the second base station device after a radio communication with the second base station device has started; and means for transmitting a switching request for a communication path to the another base station device after the data acquisition destination switching means has switched the acquisition destination of data.

Further, the present invention provides a base station device that communicates with a first base station device, which performs a radio communication with a first mobile station device, via a network, and performs a radio communication with a second mobile station device which makes a call connection with the first mobile station device, the base station device including: means for starting a communication with a second base station device being a handover destination via the network, with a handover start of the first mobile station device; and communication path control means for completing the communication with the first base station device in response to a switching request for a communication path which is transmitted from the first mobile station device which switches an acquisition destination of data transmitted from the second mobile station device from the first base station device to the second base station device after starting the communication.

Further, the present invention provides a handover method in a mobile communication system including a first mobile station device that performs handover from a first base station device to a second base station device, and another base station device that communicates with each of the first and second base station devices via a network, and performs a radio communication with a second mobile station device that makes a call connection with the first mobile station device, the method including: switching, by the first mobile station device, an acquisition destination of data transmitted from the second mobile station device from the first base station device to the second base station device after the first mobile station device starts a radio communication with the second base station device; transmitting, by the first mobile station device, a switching request for a communication path to the another base station device after the first mobile station device switches the acquisition destination of data; and completing, by the another base station device, a communication with the first base station device in response to the switching request for the communication path which is transmitted from the first mobile station device.

BEST MODE FOR CARRYING OUT THE INVENTION

Hereinafter, an embodiment of the present invention is described in detail with reference to the drawings.

Figure 1:
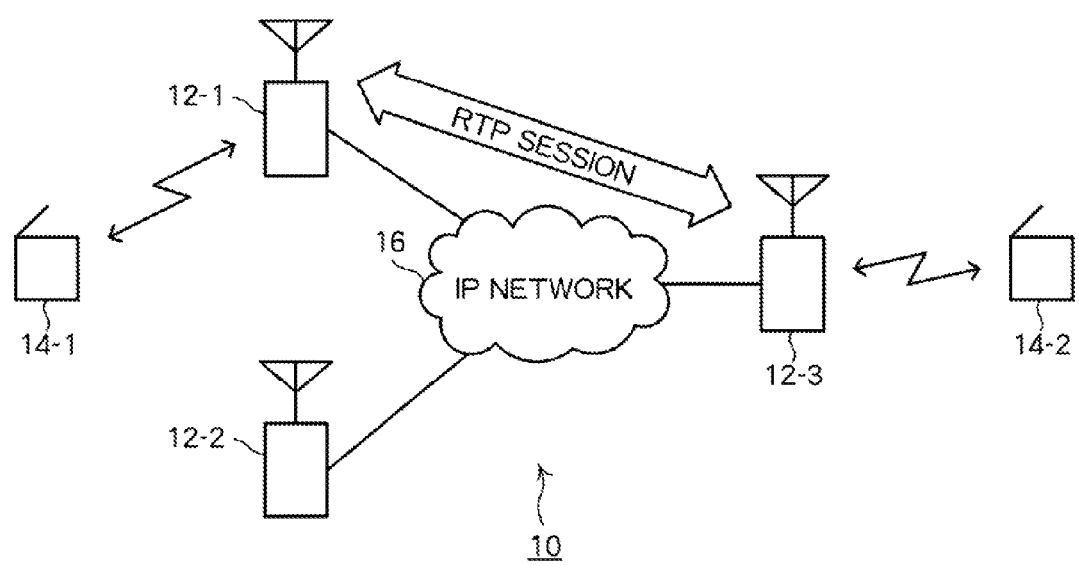
FIG. 1 A diagram illustrating an entire configuration of a mobile communication system according to an embodiment of the present invention.

FIG. 1 is a diagram illustrating an entire configuration of a mobile communication system 10 according to the embodiment of the present invention. As illustrated in FIG. 1, a mobile communication system 10 includes a plurality of base stations 12 (in this example, only base stations 12-1 to 12-3 are illustrated), and a plurality of mobile stations 14 (in this example, only mobile stations 14-1 and 14-2 are illustrated). The base stations 12-1 to 12-3 are connected to each other via an IP network 16.

In the mobile communication system 10, when the mobile station 14-1 performs a voice communication with the mobile station 14-2, as illustrated in FIG. 1, an RTP session is established between the base station 12-1 that makes a radio connection with the mobile station 14-1 and the base station 12-3 that makes a radio connection with the mobile station 14-2, and voice data is transmitted or received through the RTP session. In this state, when the mobile station 14-1 performs handover from the base station 12-1 to the base station 12-2, voice data is transmitted or received by the aid of an RTP session which is newly established between the base station 12-2 and the base station 12-3. In particular, the mobile communication system 10 according to this embodiment has a function of switching the RTP session between the base stations 12 so as not to interrupt data received by the mobile station 14-1 undergoing handover.

Hereinafter, a description is given in detail of configurations of the base station 12-3 and the mobile station 14-1 illustrated in FIG. 1 in order to realize the above-mentioned function.

Figure 2:
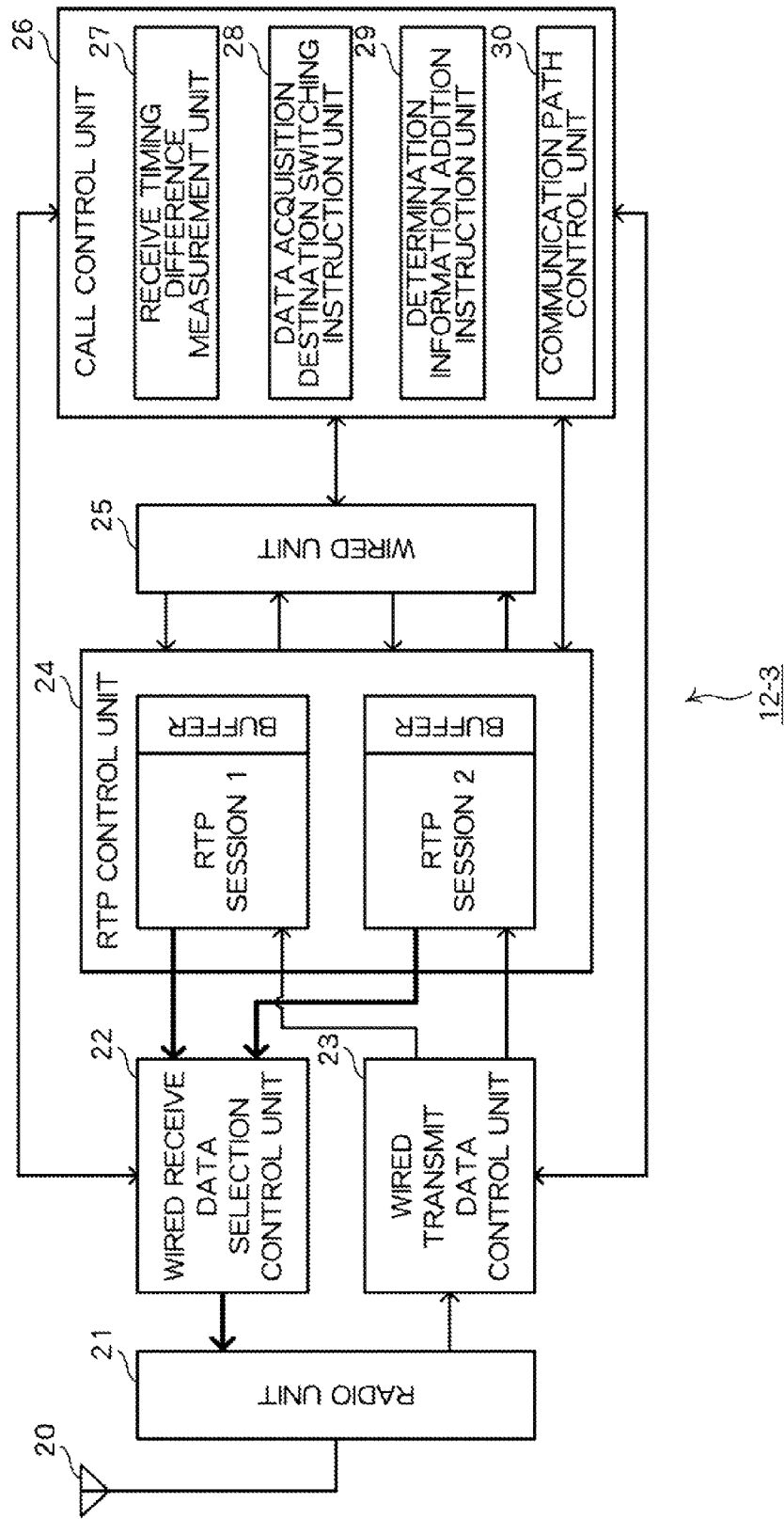
FIG. 2 A functional block diagram illustrating a base station according to the embodiment of the present invention.

FIG. 2 is a functional block diagram of the base station 12-3. As illustrated in FIG. 2, the base station 12-3 includes an antenna 20, a radio unit 21, a wired receive data selection control unit 22, a wired transmit data control unit 23, an RTP control unit 24, a wired unit 25, and a call control unit 26. Among those units, the wired receive data selection control unit 22, the wired transmit data control unit 23, the RTP control unit 24, and the call control unit 26 are made up of, for example, a CPU and a program for controlling the operation of the CPU.

The antenna 20 radiates a radio signal supplied from the radio unit 21. Further, the antenna 20 receives a radio signal transmitted from the mobile station 14-2, and outputs the radio signal to the radio unit 21. It should be noted that the transmit and receive are switched in time division according to an instruction of the radio unit 21.

The radio unit 21 includes a power amplifier, a low noise amplifier, a bandpass filter, a mixer, a D/A converter, an A/D converter, a modulator circuit, a demodulator circuit, and the like. The radio unit 21 converts wired receive data input from the wired receive data selection control unit 22 into a radio signal, amplifies the converted radio signal up to a transmit power level, and supplies the amplified radio signal to the antenna 20. Further, the radio unit 21 converts the radio signal received by the antenna 20 into a baseband signal, and outputs the baseband signal to the wired transmit data control unit 23 as wired transmit data.

The wired receive data selection control unit 22 outputs the wired receive data input from the RTP control unit 24 to the radio unit 21. In particular, after the base station 12-3 has established two RTP sessions with handover of the mobile station 14-1, that is, after a new RTP session 2 has been established with respect to the handover destination base station 12-2 in addition to the RTP session 1 that has been already established with respect to the handover source base station 12-1, the wired receive data selection control unit 22 switches the acquisition destination of the wired receive data output to the radio unit 21 from the RTP session 1 to the RTP session 2 according to an instruction of the call control unit 26 (a data acquisition destination switching instruction unit 28) which is described later.

The wired transmit data control unit 23 transmits the wired transmit data input from the radio unit 21 through the RTP control unit 24. In particular, while the base station 12-3 is establishing the RTP sessions 1 and 2 with handover of the mobile station 14-1, the wired transmit data control unit 23 transmits the wired transmit data by each of the RTP sessions 1 and 2 according to an instruction of the call control unit 26.

Figure 4:
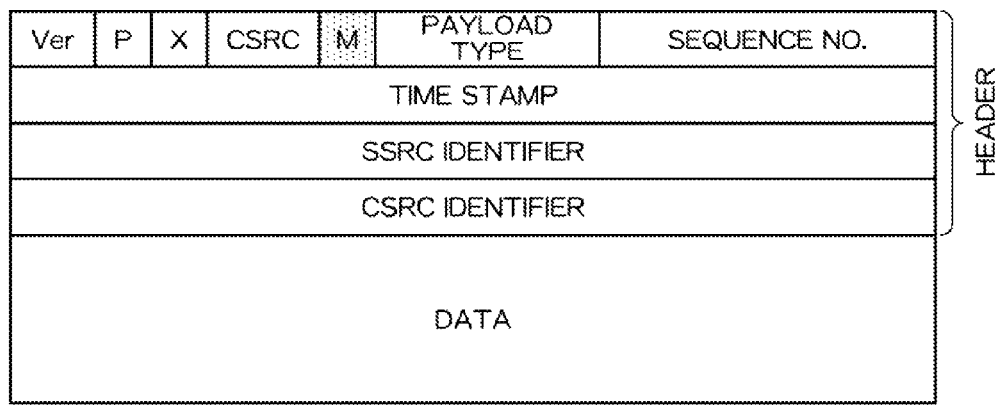
FIG. 4 A diagram illustrating a structure of an RTP packet.

Further, the wired transmit data control unit 23 adds identity determination information (flag) for determining that the respective pieces of wired transmit data transmitted by the RTP sessions 1 and 2 are identical with each other to those pieces of wired transmit data according to an instruction of the call control unit 26 (a determination information addition instruction unit 29). For example, the wired transmit data control unit 23 may add given information to the wired transmit data so that marker (M, refer to FIG. 4) included in the header of the RTP packet transmitted by the RTP sessions 1 and 2 becomes "1".

Figure 5:
FIG. 5 A diagram illustrating a structure of a radio layer 1 frame.

It should be noted that the RTP packet transmitted from the base station 12-3 arrives at the mobile station 14-1 after the RTP packet has been converted into a corresponding radio frame in the handover destination base station 12-2 (or the handover source base station 12-1). For example, the RTP packet (refer to FIG. 4) in which M within the header is "1" is converted into a radio layer 1 frame in which all of bits of SA are "1" (refer to FIG. 5) in the base station 12-2 (or the base station 12-1). That is, the protocol is converted by the base station 12-2 (or the base station 12-1) which is a transfer point between the IP network 16 and the radio transmission path so as to maintain the identity determination information added to data.

The RTP control unit 24 establishes an RTP session with the other base station 12, or releases the established RTP session according to an instruction of the call control unit 26 (a communication path control unit 30). In particular, the RTP control unit 24 establishes a new RTP session 2 with respect to the handover destination base station 12-2 in addition to the RTP session that has been already established with respect to the handover source base station 12-1 with handover of the mobile station 14-1.

Further, the RTP control unit 24 confirms whether or not the RTP packet to which the identity determination information (flag) for determining the identical data transmitted from the mobile station 14-1 has been added is received by each of the RTP sessions 1 and 2 while the two RTP sessions 1 and 2 are maintained with handover of the mobile station 14-1 (for example, M included in the header of the received RTP packet is "1", or not). Then, upon receiving the RTP packet to which the identity determination information has been added, the RTP control unit 24 notifies the call control unit 26 (a receive timing difference measurement unit 27) of that fact.

The RTP sessions 1 and 2 established by the RTP control unit 24 each output payload data included in the RTP packet input from the wired unit 25 to the wired receive data selection control unit 22 as wired receive data. Further, the RTP sessions 1 and 2 each add a given RTP header to the wired transmit data input from the wired transmit data control unit 23, and output the generated RTP packet to the wired unit 25. It should be noted that the RTP sessions 1 and 2 each have a buffer for temporarily storing data input from the wired unit 25.

The wired unit 25 receives an IP packet based on the UDP/IP protocol from the other base station 12 on the IP network 16, and outputs the RTP packet included in the received IP packet to the RTP control unit 24. Further, the wired unit 25 adds a given UDP header and a given IP header to the RTP packet input from the RTP control unit 24, and transmits the IP packet including the RTP packet to the other base station 12 through the IP network 16. In particular, the wired unit 25 transmits and receives the RTP packet between the base stations 12-1 and 12-2 by the aid of the RTP sessions 1 and 2, respectively, while the RTP control unit 24 maintains the two RTP sessions 1 and 2 with handover of the mobile station 14-1.

Further, the wired unit 25 receives control data such as a communication path switching request transmitted from the mobile station 14-1 or an instruction (notification) related to call control which is transmitted from an exchange (not shown) through the IP network 16, and outputs the control data to the call control unit 26.

The call control unit 26 includes the receive timing difference measurement unit 27, the data acquisition destination switching instruction unit 28, the determination information addition instruction unit 29, and the communication path control unit 30, and performs various processing related to the call control.

The receive timing difference measurement unit 27 receives, from the RTP control unit 24, a notification that the RTP packet to which the identity determination information (flag) transmitted from the mobile station 14-1 has been added has been received by each of the RTP sessions 1 and 2, while the RTP control unit 24 maintains the two RTP sessions 1 and 2 with handover of the mobile station 14-1. Then, the receive timing difference measurement unit 27 measures, on the basis of that notification, a difference ΔT between a timing T1 at which data to which the identity determination information has been added has been received by the RTP session 1 (through the handover source base station 12-1), and a timing T2 at which data to which the identity determination information has been added has been received by the RTP session 2 (through the handover destination base station 12-2), where ΔT=T1−T2.

The data acquisition destination switching instruction unit 28, after the RTP control unit 24 has established the RTP session 2 with respect to the handover destination base station 12-2 with handover of the mobile station 14-1, instructs the wired receive data selection control unit 22 to switch the acquisition destination of data, which is transmitted to the mobile station 14-2, from the base station 12-1 (RTP session 1) to the base station 12-2 (RTP session 2) on the basis of the timing difference ΔT measured by the receive timing difference measurement unit 27.

Specifically, in a case of ΔT<0 (a case in which in the identical data transmitted to the mobile station 14-2 from the mobile station 14-1, data transmitted through a path including the RTP session 1 arrives at the base station 12-3 earlier than data transmitted through a path including the RTP session 2), the data acquisition destination switching instruction unit 28 instructs the wired receive data selection control unit 22 to stop selection of data received by the RTP session 1 and to select data received by the RTP session 2 from data received after |ΔT|.

Further, in a case of ΔT=0 (a case in which in the identical data transmitted to the mobile station 14-2 from the mobile station 14-1, data transmitted through the path including the RTP session 1 and data transmitted through the path including the RTP session 2 arrive at the base station 12-3 at the same time), the data acquisition destination switching instruction unit 28 instructs the wired receive data selection control unit 22 to stop selection of data received by the RTP session 1 and to select data received by the RTP session 2 thereafter.

On the other hand, in a case of ΔT>0 (a case in which in the identical data transmitted to the mobile station 14-2 from the mobile station 14-1, data transmitted through the path including the RTP session 1 arrives at the base station 12-3 later than data transmitted through the path including the RTP session 2), the data acquisition destination switching instruction unit 28 instructs the wired receive data selection control unit 22 to stop selection of data received by the RTP session 1 and select data received by the RTP session 2 back to data received before |ΔT|.

As a result, the last data transmitted to the mobile station 14-2 among data received by the RTP session 1, and the first data transmitted to the mobile station 14-2 among data received by the RTP session 2 are continuous to each other. That is, even if the RTP session is switched with handover of the mobile station 14-1, the continuity of data which is transmitted from the mobile station 14-1 to the mobile station 14-2 is ensured.

The determination information addition instruction unit 29, after the RTP control unit 24 has established the RTP session 2 with respect to the handover destination base station 12-2 with handover of the mobile station 14-1, instructs the wired transmit data control unit 23 to add, to the respective pieces of wired transmit data which are transmitted by the RTP sessions 1 and 2, the identity determination information (flag) for determining that those pieces of data are identical with each other.

Upon receiving the communication path switching request transmitted from the mobile station 14-1 through the wired unit 25, the communication path control unit 30 instructs the RIP control unit 24 to release the RTP session 1 established with respect to the handover source base station 12-1 after the wired receive data selection control unit 22 has switched the acquisition destination of the wired receive data from the RTP session 1 to the RTP session 2 according to an instruction of the data acquisition destination switching instruction unit 28.

Figure 3:
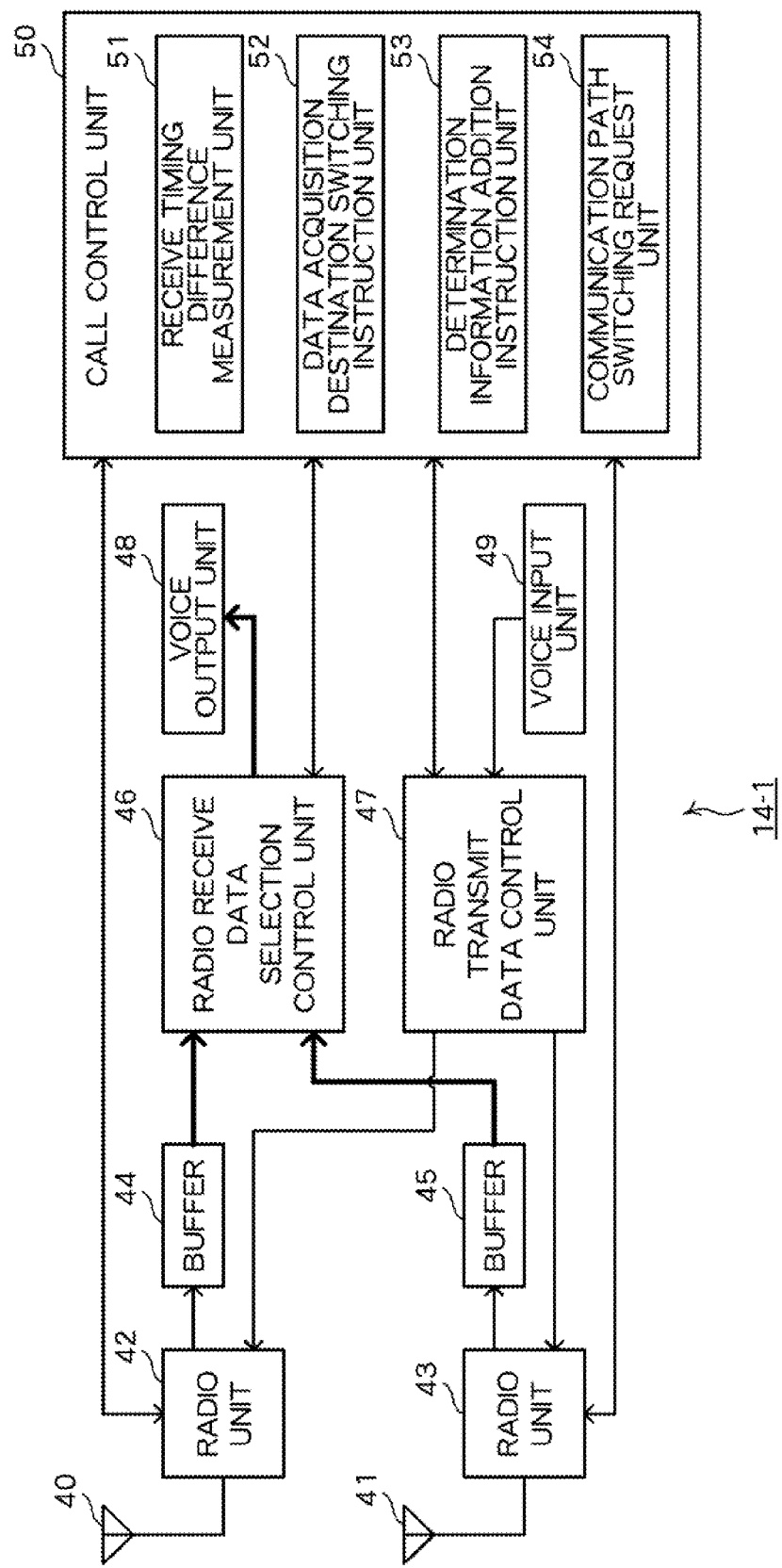
FIG. 3 A functional block diagram illustrating a mobile station according to the embodiment of the present invention.

FIG. 3 is a functional block diagram of the mobile station 14-1. As illustrated in FIG. 3, the mobile station 14-1 includes antennas 40 and 41, radio units 42 and 43, buffers 44 and 45, a radio receive data selection control unit 46, a radio transmit data control unit 47, a voice output unit 48, a voice input unit 49, and a call control unit 50. Among those units, the radio receive data selection control unit 46, the radio transmit data control unit 47, and the call control unit 50 are made up of, for example, a CPU and a program for controlling the operation of the CPU.

The antennas 40 and 41 radiate radio signals supplied from the radio units 42 and 43, respectively. Further, the antennas 40 and 41 receive radio signals transmitted from the base station 12, and output the radio signals to the radio units 42 and 43, respectively. It should be noted that the transmit and receive are switched in time division according to an instruction of the radio unit 21.

Particularly, the mobile station 14-1 newly starts a radio communication with the base station 12-2 in addition to the radio communication with the base station 12-1 with handover of from the base station 12-1 to the base station 12-2. In this example, the antenna 40 and the radio unit 42 are used for the radio communication with the handover source base station 12-1, and the antenna 41 and the radio unit 43 are used for the radio communication with the handover destination base station 12-2.

The radio units 42 and 43 each include a power amplifier, a low noise amplifier, a bandpass filter, a mixer, a D/A converter, an A/D converter, a modulator circuit, a demodulator circuit, and the like. The radio units 42 and 43 convert data input from the radio transmit data control unit 47 into radio signals, amplify the converted radio signals up to a transmit power level, and supplies the amplified radio signals to the antennas 40 and 41, respectively. Further, the radio units 42 and 43 convert the radio signals received by the antennas 40 and 41 into baseband signals, and output the baseband signals to the buffers 44 and 45, respectively.

The buffers 44 and 45 each include a memory or the like, and temporarily store the baseband signal input from each of the radio units 42 and 43 as radio receive data.

The radio receive data selection control unit 46 reads radio receive data from any one of the buffers 44 and 45, and outputs the read radio receive data to the voice output unit 48. In particular, after the mobile station 14-1 has started a radio communication with the handover destination base station 12-2 with handover, the radio receive data selection control unit 46 switches the acquisition destination of the radio receive data which is output to the voice output unit 48 from the buffer 44 to the buffer 45 according to an instruction of a call control unit 50 (a data acquisition destination switching instruction unit 52) which is described later.

Further, the radio receive data selection control unit 46 confirms whether or not a radio frame to which the identity determination information (flag) for determining the identical data has been added, which has been transmitted from the base station 12-3, is received (for example, all of bits of SA included in the radio layer 1 frame are "1", or not), while the mobile station 14-1 performs a radio communication with each of the handover source base station 12-1 and the handover destination base station 12-2. Then, upon receiving the radio frame to which the identity determination information has been added, the radio receive data selection control unit 46 notifies the call control unit 50 (a receive timing difference measurement unit 51) of that fact.

The radio transmit data control unit 47 outputs voice data input from the voice input unit 49 to at least one of the radio units 42 and 43 as radio transmit data. In particular, the radio transmit data control unit 47 outputs the radio transmit data to both of the radio units 42 and 43 according to an instruction of the call control unit 50 while the mobile station 14-1 performs a radio communication with each of the handover source base station 12-1 and the handover destination base station 12-2.

Further, the radio transmit data control unit 47 adds identity determination information (flag) for determining that the respective pieces of radio transmit data transmitted by the radio units 42 and 43 are identical with each other to those pieces of radio transmit data according to an instruction of the call control unit 50 (a determination information addition instruction unit 53). For example, the radio transmit data control unit 47 may add given information to the radio transmit data so that all of bits of SA (refer to FIG. 5) included in the radio layer 1 frame transmitted by the radio units 42 and 43 become "1".

The voice output unit 48 includes a speaker (or a headphone jack), and outputs, from the speaker, a voice corresponding to the radio receive data input from the radio receive data selection control unit 46.

The voice input unit 49 includes a microphone, converts a voice signal input from the microphone into voice data, and outputs the converted voice data to the radio transmit data control unit.

The call control unit 50 includes the receive timing difference measurement unit 51, the data acquisition destination switching instruction unit 52, the determination information addition instruction unit 53, and a communication path switching request unit 54, and performs various processing related to the call control for the mobile station 14-1.

The receive timing difference measurement unit 51 receives, from the radio receive data selection control unit 46, a notification that the radio frame to which the identity determination information (flag) has been added has been received by each of the radio units 42 and 43, while the mobile station 14-1 performs a radio communication with each of the handover source base station 12-1 and the handover destination base station 12-2. Then, the receive timing difference measurement unit 51 measures, on the basis of that notification, a difference $\Delta t$ between a timing t1 at which data to which the identity determination information has been added has been received through the handover source base station 12-1, and a timing t2 at which data to which the identity determination information has been added has been received through the handover destination base station 12-2, where $\Delta t = t1 - t2$.

The data acquisition destination switching instruction unit 52, after the mobile station 14-1 has started the radio communication with respect to the handover destination base station 12-2 with handover, instructs the radio receive data selection control unit 46 to switch the acquisition destination of the radio receive data, which is output to the voice output unit 48, from the base station 12-1 (radio unit 42 and buffer 44) to the base station 12-2 (radio unit 43 and buffer 45) on the basis of the timing difference $\Delta T$ measured by the receive timing difference measurement unit 51.

Specifically, in a case of $\Delta t < 0$ (a case in which in the identical data transmitted to the mobile station 14-1 from the base station 12-3, data transmitted through a path going through the base station 12-1 arrives at the mobile station 14-1 earlier than data transmitted through a path going through the base station 12-2), the data acquisition destination switching instruction unit 52 instructs the radio receive data selection control unit 46 to stop selection of data received by the radio unit 42 and to select data received by the radio unit 43 from data received after |Δt|.

Further, in a case of Δt=0 (a case in which in the identical data transmitted to the mobile station 14-1 from the base station 12-3, data transmitted through the path going through the base station 12-1 and data transmitted through the path going through the base station 12-2 arrive at the mobile station 14-1 at the same time), the data acquisition destination switching instruction unit 52 instructs the radio receive data selection control unit 46 to stop selection of data received by the radio unit 42 and to select data received by the radio unit 43 thereafter.

On the other hand, in a case of Δt>0 (a case in which in the identical data transmitted to the mobile station 14-1 from the base station 12-3, data transmitted through the path going through the base station 12-1 arrives at the mobile station 14-1 later than data transmitted through the path going through the base station 12-2), the data acquisition destination switching instruction unit 52 instructs the radio receive data selection control unit 46 to stop selection of data received by the radio unit 42 and to select data received by the radio unit 43 back to data received before |ΔT|.

As a result, the last data output to the voice output unit 48 among data received by the radio unit 42, and the first data output to the voice output unit 48 among data received by the radio unit 43 are continuous to each other. That is, even if the RTP session is switched with handover of the mobile station 14-1, the continuity of data which is received by the mobile station 14-1 from the mobile station 14-2 is ensured.

The determination information addition instruction unit 53, after the mobile station 14-1 has started the radio communication with respect to the handover destination base station 12-2 with handover, instructs the radio transmit data control unit 47 to add, to the respective pieces of radio transmit data which are transmitted by the radio units 42 and 43, the identity determination information (flag) for determining that those pieces of data are identical with each other.

The communication path switching request unit 54 instructs the radio unit 43 (or the radio unit 42) to transmit the communication path switching request to the base station 12-3 after the radio receive data selection control unit 46 has switched the acquisition destination of the radio receive data from the radio unit 42 to the radio unit 43 according to an instruction of the data acquisition destination switching instruction unit 52. With this arrangement, the use of data received by a path including the RTP session 2 (path going through the handover destination base station 12-2) starts before the base station 12-3 releases the RTP session 1 established with respect to the handover source base station 12-1. Therefore, voice output from the voice output unit 48 during handover is not interrupted.

Now, the operation of the base station 12-3 and the mobile station 14-1 is described.

FIGS. 6 to 13 are diagrams for illustrating a procedure for the mobile station 14-1 that performs a voice communication with the mobile station 14-2 to perform handover from the base station 12-1 to the base station 12-2 in the mobile communication system 10 illustrated in FIG. 1.

Figure 6:
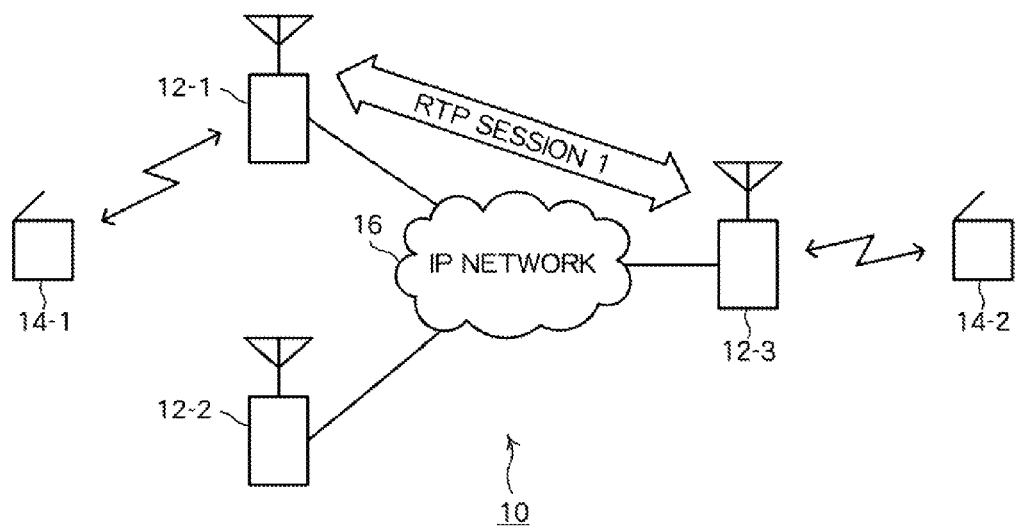
FIG. 6 A diagram for illustrating a handover procedure according to the embodiment of the present invention.
Figure 7:
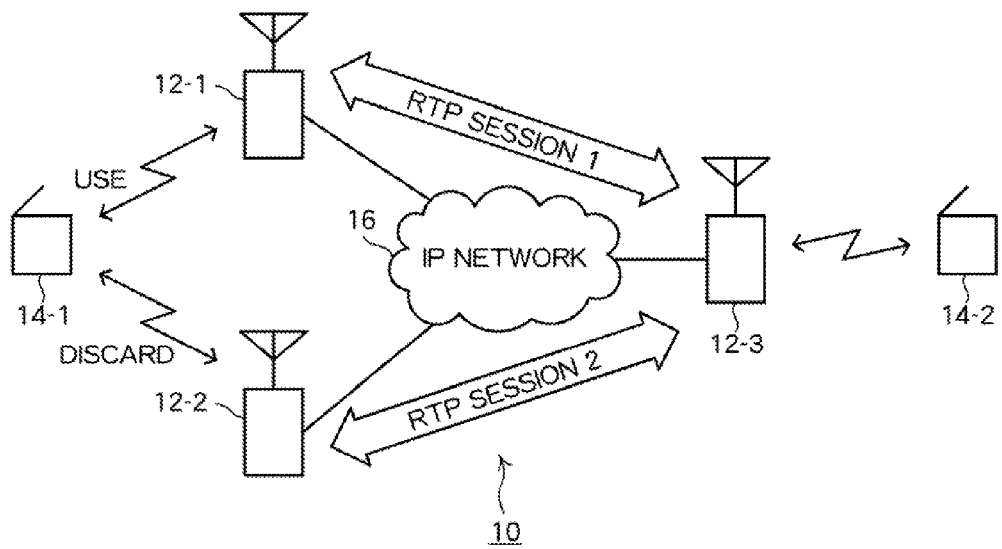
FIG. 7 A diagram for illustrating the handover procedure according to the embodiment of the present invention.

Before starting handover, the RTP session 1 is established between the base station 12-1 and the base station 12-3 that makes a radio connection with the mobile station 14-2 (FIG. 6). When the mobile station 14-1 starts handover to the base station 12-2, a radio communication starts between the mobile station 14-1 and the base station 12-2, and a new RTP session 2 is also established between the base station 12-2 and the base station 12-3, to transmit and receive data through both sessions of the RTP session 1 and the RTP session 2 (FIG. 7).

In this state, only data received by the RTP session 1 is used by the mobile stations 14-1 and 14-2. That is, the mobile station 14-1 uses only data received from the handover source base station 12-1 (voice output), and discards data received from the handover destination base station 12-2. Further, the base station 12-3 transmits only data received by the RTP session 1 to the mobile station 14-2, and discards data received by the RTP session 2.

Figure 8:
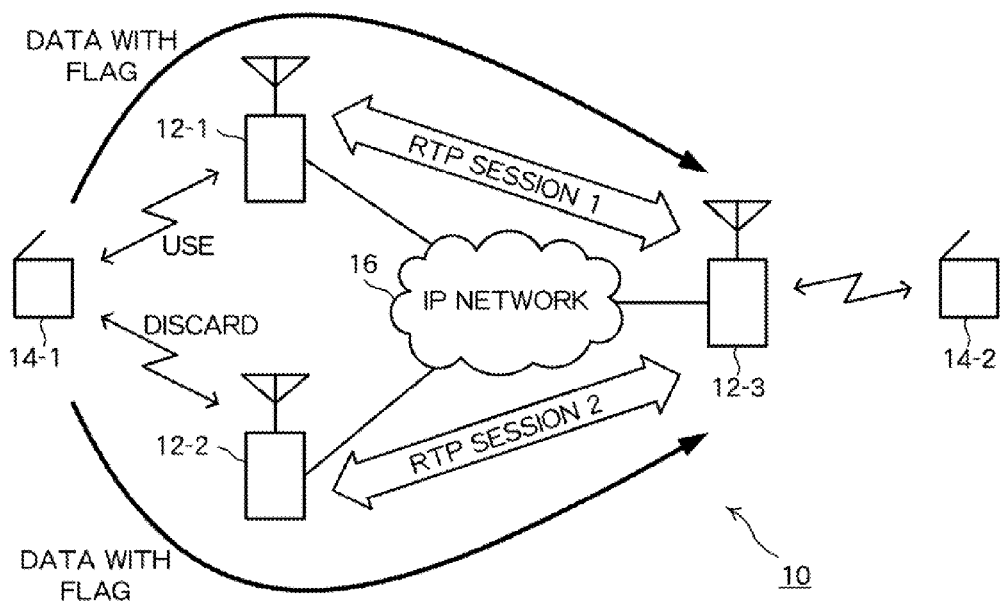
FIG. 8 A diagram for illustrating the handover procedure according to the embodiment of the present invention.

After the mobile station 14-1 has started the radio communication with the base station 12-2, the mobile station 14-1 transmits identical data (data with a flag), to which the identity determination information has been added, to the base station 12-3 through each of the handover source base station 12-1 and the handover destination base station 12-2 (refer to FIG. 8). Then, the base station 12-3 measures a difference ΔT between a timing at which the base station 12-3 has the received data with a flag, which has been transmitted from the mobile station 14-1, through the base station 12-1 (by the RTP session 1), and a timing at which the base station 12-3 has received the data with a flag, which has been transmitted from the mobile station 14-1, through the base station 12-2 (by the RTP session 2).

Figure 9:
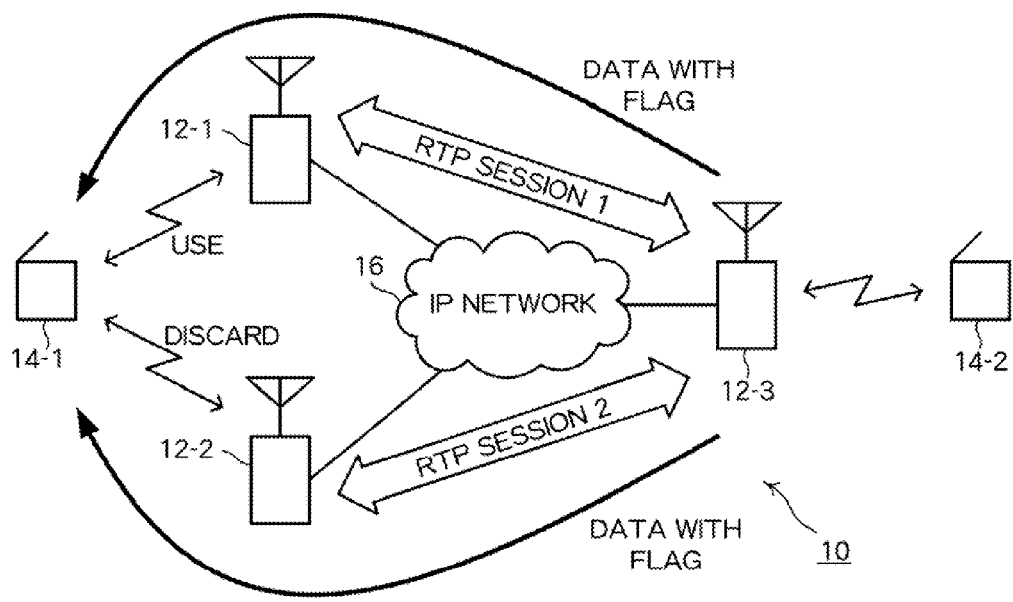
FIG. 9 A diagram for illustrating the handover procedure according to the embodiment of the present invention.

On the contrary, the base station 12-3 also transmits data with a flag to the mobile station 14-1 through each of the handover source base station 12-1 and the handover destination base station 12-2 (refer to FIG. 9). Then, the mobile station 14-1 measures a difference ΔT between a timing at which the mobile station 14-1 has received the data with a flag, which has been transmitted from the base station 12-3, through the base station 12-1 (by the RTP session 1), and a timing at which the mobile station 14-1 has received the data with a flag, which has been transmitted from the base station 12-3, through the base station 12-2 (by the RTP session 2).

Figure 10:
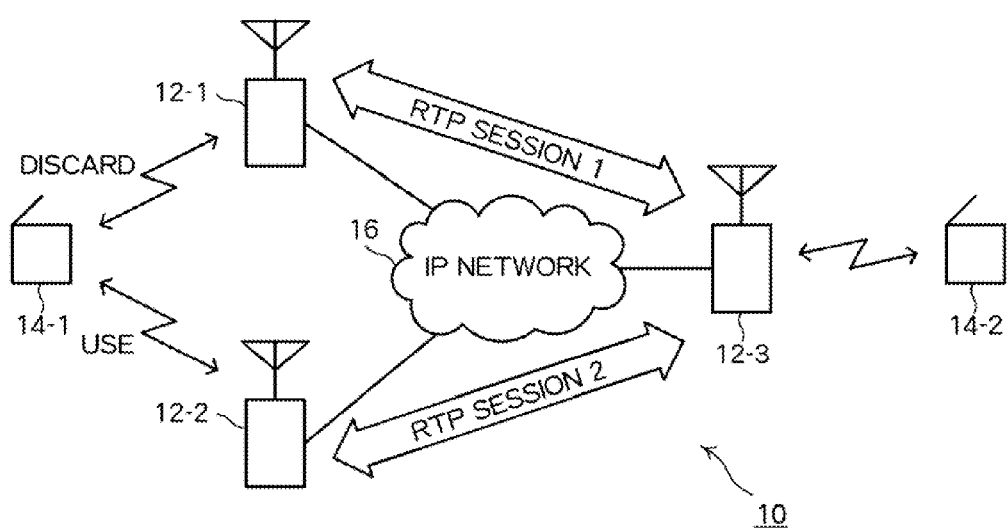
FIG. 10 A diagram for illustrating the handover procedure according to the embodiment of the present invention.

Then, the mobile station 14-1 switches, on the basis of the measured timing difference ΔT, the acquisition destination of the radio receive data from the handover source base station 12-1 to the handover destination base station 12-2 (refer to FIG. 10). As a result, the mobile station 14-1 discards data received from the handover source base station 12-1, and starts to use (output the voice) data received from the handover destination base station 12-2.

Figure 11:
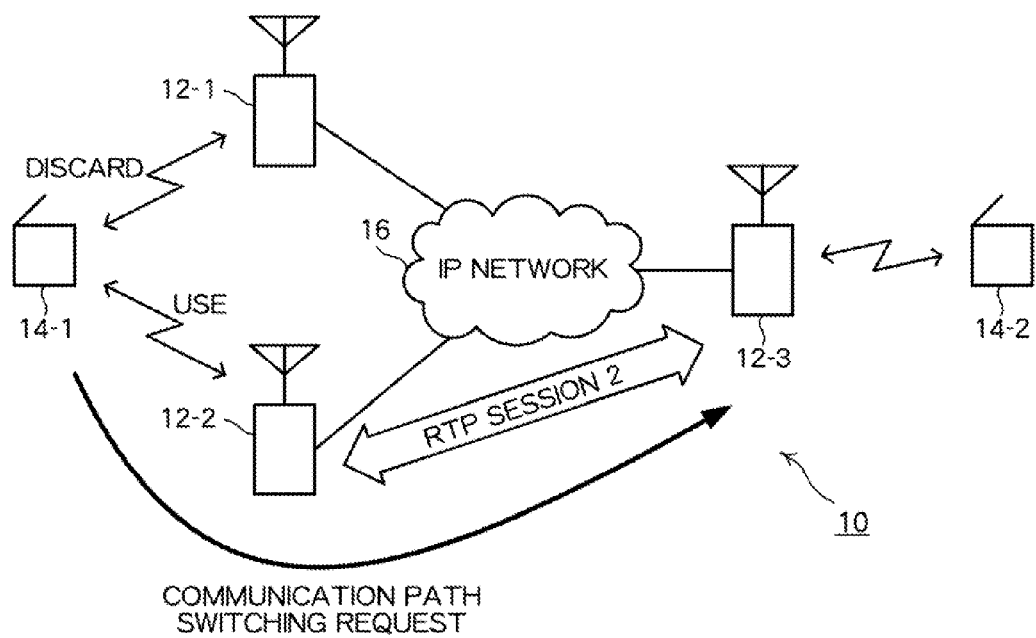
FIG. 11 A diagram for illustrating the handover procedure according to the embodiment of the present invention.
Figure 12:
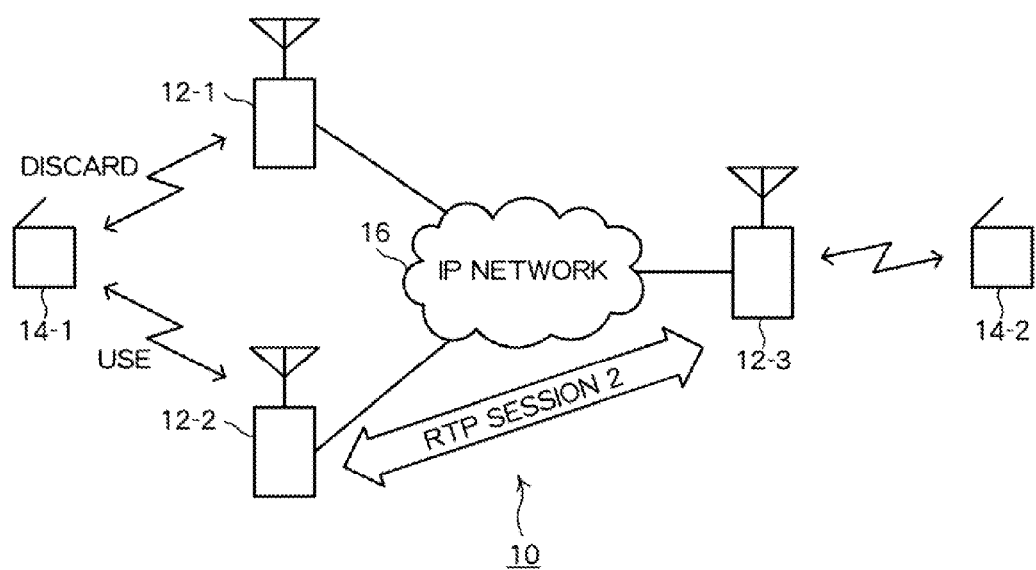
FIG. 12 A diagram for illustrating the handover procedure according to the embodiment of the present invention.

After having switched the acquisition destination of the radio receive data, the mobile station 14-1 transmits a communication path switching request to the base station 12-3 (refer to FIG. 11). The communication path switching request may be transmitted through any one of the base station 12-1 and the base station 12-2.

Upon receiving the communication path switching request transmitted from the mobile station 14-1, the base station 12-3 switches the acquisition destination of the wired receive data from the handover source base station 12-1 to the handover destination base station 12-2. As a result, the base station 12-3 discards data received by the RTP session 1, and starts to transmit data received by the RTP session 2 to the mobile station 12-2. Thereafter, the base station 12-3 releases the RTP session 1 established with respect to the handover source base station 12-1 in response to the above-mentioned communication path switching request (refer to FIG. 12).

Figure 13:
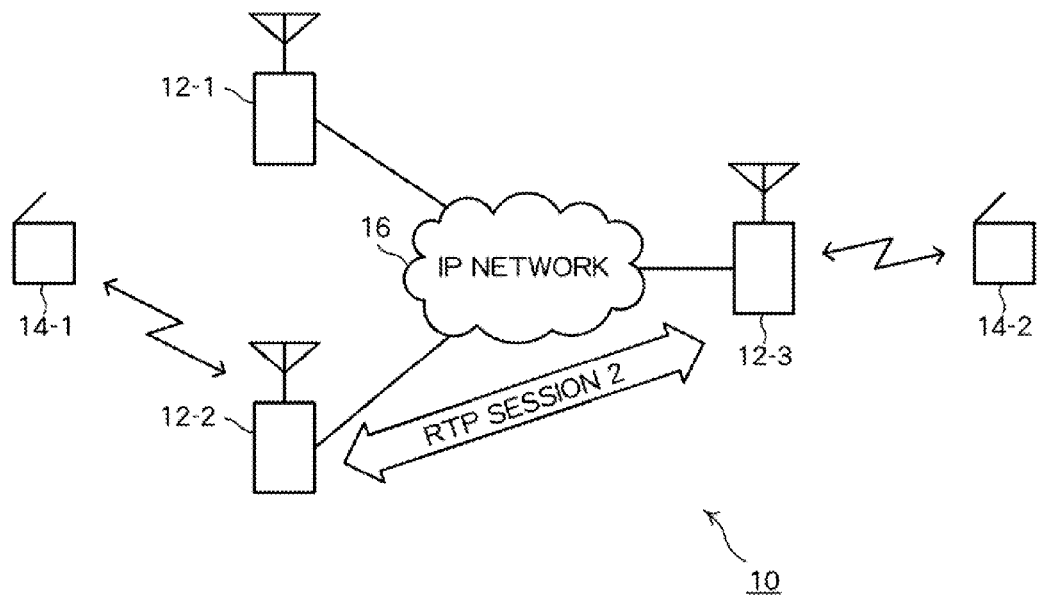
FIG. 13 A diagram for illustrating the handover procedure according to the embodiment of the present invention.
Figure 14:
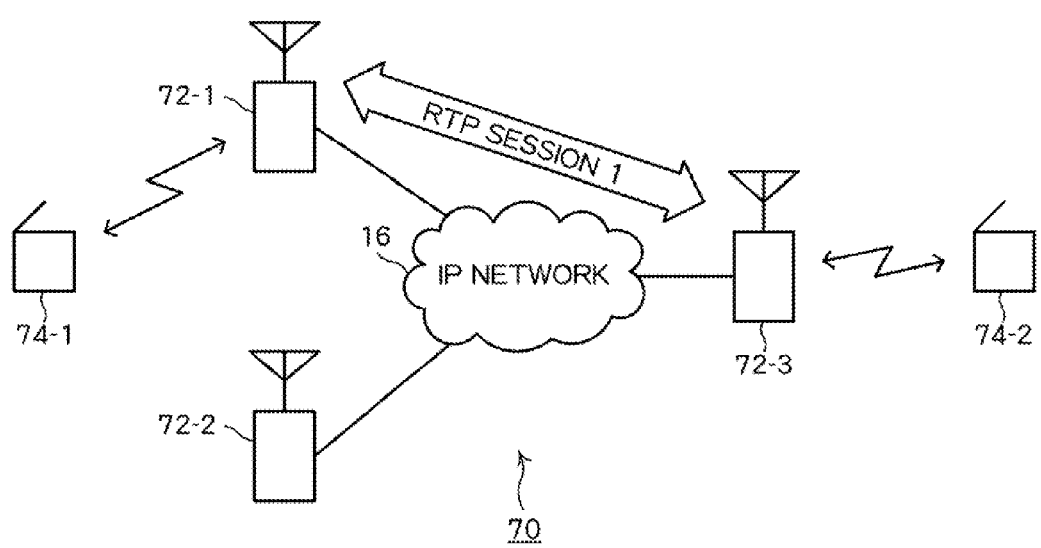
FIG. 14 A diagram for illustrating a conventional handover procedure.
Figure 15:
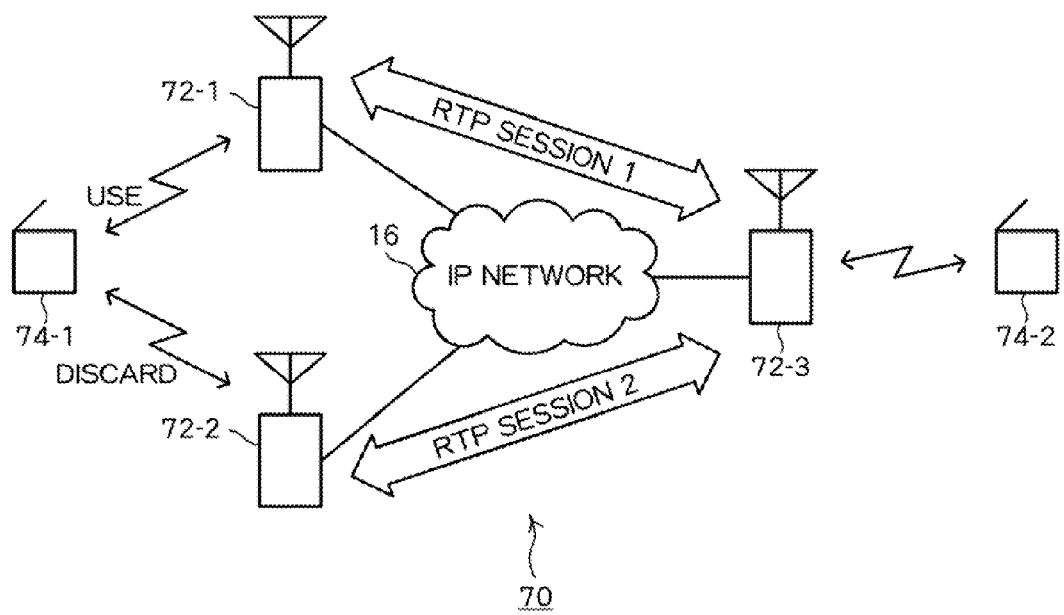
FIG. 15 A diagram for illustrating the conventional handover procedure.
Figure 16:
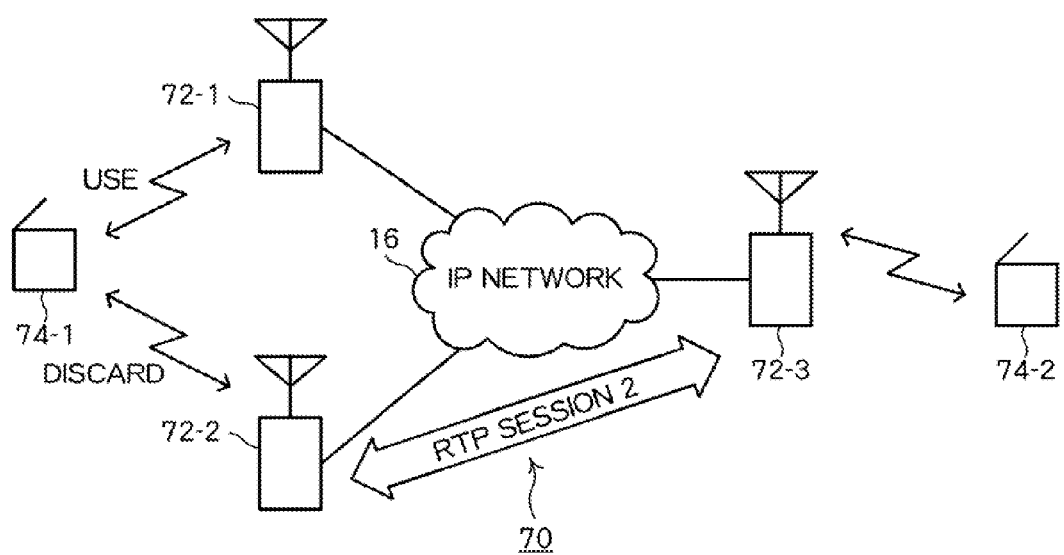
FIG. 16 A diagram for illustrating the conventional handover procedure.
Figure 17:
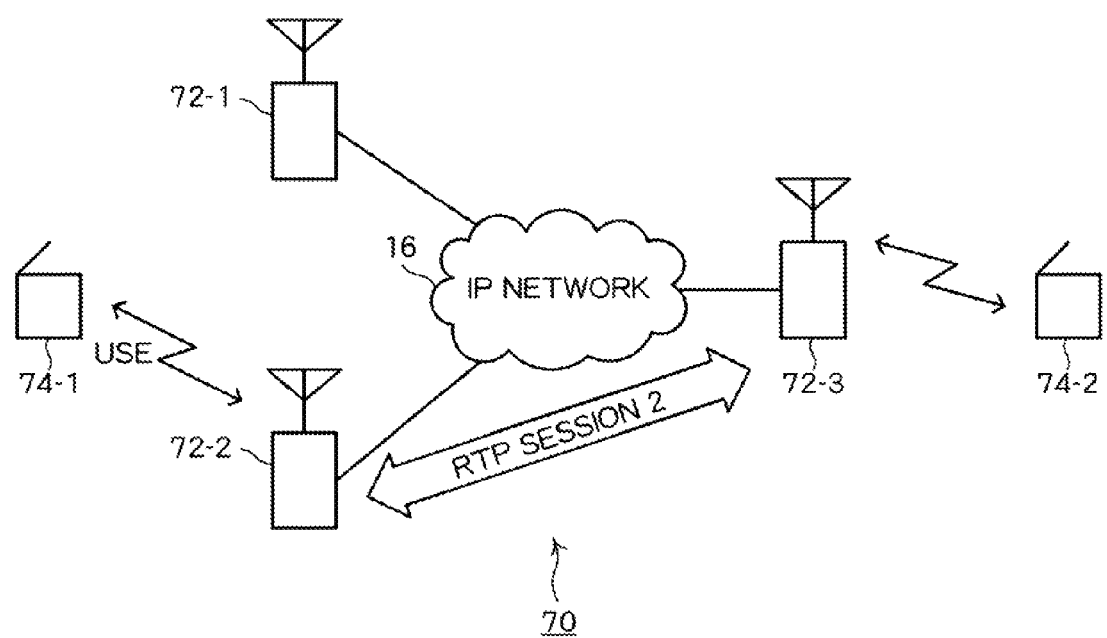
FIG. 17 A diagram for illustrating the conventional handover procedure.

The mobile station 14-1 completes the radio communication with the handover source base station 12-1 with release of the RTP session 1 (refer to FIG. 13). In this way, handover of from the base station 12-1 to the base station 12-2 by the mobile station 14-1 is completed.

In the mobile communication system 10 described above, after the mobile station 14-1 has switched the acquisition destination of the receive data from the handover source base station 12-1 to the handover destination base station 12-2, the base station 12-3 releases the RTP session 1 established with respect to the base station 12-1. As a result, the RTP session between the base stations 12 can be switched so as not to interrupt data received by the mobile station 14-1 undergoing handover.

It should be noted that the present invention is not limited to the above-mentioned embodiment, but various modifications can be made. For example, in the above description, the present invention is applied to the voice communication in the mobile communication system in which the base stations are connected to each other via the IP network. However, the present invention can be applied to the general communication in the mobile communication system in which the base stations are connected to each other via a network (including radio network) other than the IP network. Further, not only the RTP but also a UDP and other protocols may be applied to data transmission between the base stations.

The invention claimed is:

1. A mobile communication system comprising:
a first mobile station device that performs handover from a first base station device to a second base station device; and
another base station device that communicates with each of the first and second base station devices via a network, and performs a radio communication with a second mobile station device that makes a call connection with the first mobile station device,
wherein the first mobile station device includes:
first data acquisition destination switching means for switching an acquisition destination of data transmitted from the second mobile station device from the first base station device to the second base station device after a radio communication with the second base station device starts;
means for transmitting a switching request for a communication path to the another base station device after the first data acquisition destination switching means switches the acquisition destination of data; and
first receive timing difference measurement means for measuring a difference between a timing at which the first mobile station device receives data transmitted from the another base station device through the first base station device, and a timing at which the first mobile station device receives data identical with the data transmitted from the another base station device through the second base station device, wherein
the first data acquisition destination switching means switches the data acquisition destination on the basis of the timing difference measured by the first receive timing difference measurement means, and
wherein the another base station device includes communication path control means for completing a communication with the first base station device in response to the switching request for the communication path which is transmitted from the first mobile station device.

2. The mobile communication system according to claim 1, wherein the another base station device further includes first determination information adding means for adding first determination information for determining identity to each of data transmitted to the first mobile station device through the first base station device, and data identical with the data and transmitted to the first mobile station device through the second base station device, and
wherein the first receive timing difference measurement means measures a difference between a timing at which the first mobile station device receives the data to which the first determination information is added through the first base station device, and a timing at which the first mobile station device receives the data to which the first determination information is added through the second base station device.

3. The mobile communication system according to claim 2, wherein the another base station device further includes:
second receive timing difference measurement means for measuring a difference between a timing at which the another base station device receives the data transmitted from the first mobile station device through the first base station device, and a timing at which the another base station device receives the data identical with the data transmitted from the first mobile station device through the second base station device; and
second data acquisition destination switching means for switching the acquisition destination of data transmitted to the second mobile station device from the first base station device to the second base station device on the basis of the timing difference measured by the second receive timing difference measurement means, and
wherein the communication path control means completes the communication with the first base station device after the data acquisition destination is switched by the second receive timing difference measurement means.

4. The mobile communication system according to claim 1, wherein the another base station device further includes:
second receive timing difference measurement means for measuring a difference between a timing at which the another base station device receives the data transmitted from the first mobile station device through the first base station device, and a timing at which the another base station device receives the data identical with the data transmitted from the first mobile station device through the second base station device; and
second data acquisition destination switching means for switching the acquisition destination of data transmitted to the second mobile station device from the first base station device to the second base station device on the basis of the timing difference measured by the second receive timing difference measurement means, and
wherein the communication path control means completes the communication with the first base station device after the data acquisition destination is switched by the second receive timing difference measurement means.

5. The mobile communication system according to claim 4, wherein the first mobile station device further includes second determination information adding means for adding second determination information for determining identity to each of data transmitted to the second mobile station device through the first base station device, and data identical with the data and transmitted to the second mobile station device through the second base station device, and
wherein the second receive timing difference measurement means measures a difference between a timing at which the another base station device receives the data to which the second determination information is added through the first base station device, and a timing at which the another base station device receives the data to which the second determination information is added from the second base station device.

6. A mobile station device that performs handover from a first base station device to a second base station device while maintaining a call connection with another mobile station device, the first base station device and the second base station device each communicating with another base station device that performs a radio communication with the another mobile station device via a network, the mobile station device comprising:
  data acquisition destination switching means for switching an acquisition destination of data transmitted from the another mobile station device from the first base station device to the second base station device after a radio communication with the second base station device has started;
  means for transmitting a switching request for a communication path to the another base station device after the data acquisition destination switching means has switched the acquisition destination of data; and
  receive timing difference measurement means for measuring a difference between a timing at which the first mobile station device receives data transmitted from the another base station device through the first base station device, and a timing at which the first mobile station device receives data identical with the data transmitted from the another base station device through the second base station device, wherein
  the data acquisition destination switching means switches the data acquisition destination on the basis of the timing difference measured by the receive timing difference measurement means.

7. A base station device that communicates with a first base station device, which performs a radio communication with a first mobile station device, via a network, and performs a radio communication with a second mobile station device which makes a call connection with the first mobile station device, the base station device comprising:
  means for starting a communication with a second base station device being a handover destination via the network, with a handover start of the first mobile station device; and
  communication path control means for completing the communication with the first base station device in response to a switching request for a communication path which is transmitted from the first mobile station device which switches an acquisition destination of data transmitted from the second mobile station device from the first base station device to the second base station device after starting the communication, wherein the switching is on the basis of a measured timing difference, wherein the timing difference is a difference between a timing at which the first mobile station device receives data transmitted from the base station device through the first base station device, and a timing at which the first mobile station device receives data identical with the data transmitted from the base station device through the second base station device.

8. A handover method in a mobile communication system including a first mobile station device that performs handover from a first base station device to a second base station device, and another base station device that communicates with each of the first and second base station devices via a network, and performs a radio communication with a second mobile station device that makes a call connection with the first mobile station device, the method comprising:
  measuring a difference between a timing at which the first mobile station device receives data transmitted from the another base station device through the first base station device, and a timing at which the first mobile station device receives data identical with the data transmitted from the another base station device through the second base station device;
  switching, by the first mobile station device, an acquisition destination of data transmitted from the second mobile station device from the first base station device to the second base station device after the first mobile station device starts a radio communication with the second base station device, wherein the switching is on the basis of the measured timing difference;
  transmitting, by the first mobile station device, a switching request for a communication path to the another base station device after the first mobile station device switches the acquisition destination of data; and
  completing, by the another base station device, a communication with the first base station device in response to the switching request for the communication path which is transmitted from the first mobile station device.

* * * * *